(12) United States Patent
Georgoulias et al.

(10) Patent No.: US 10,206,321 B2
(45) Date of Patent: Feb. 19, 2019

(54) AERATOR WITH VARIABLE DELAY OF CORING HEAD

(71) Applicant: DEERE & COMPANY, Moline, IL (US)

(72) Inventors: Chris M Georgoulias, Apex, NC (US); Stanley K Hall, Godwin, NC (US); Marquez Perkins, Charlotte, NC (US)

(73) Assignee: Deere & Company, Moline, IL (US)

( * ) Notice: Subject to any disclaimer, the term of this patent is extended or adjusted under 35 U.S.C. 154(b) by 526 days.

(21) Appl. No.: 14/172,679

(22) Filed: Feb. 4, 2014

(65) Prior Publication Data

US 2015/0216102 A1 Aug. 6, 2015

(51) Int. Cl.
*A01B 45/02* (2006.01)

(52) U.S. Cl.
CPC .................................. *A01B 45/023* (2013.01)

(58) Field of Classification Search
CPC ........ A01B 45/00; A01B 45/02; A01B 45/023
See application file for complete search history.

(56) References Cited

U.S. PATENT DOCUMENTS

| 1,853,079 | A | * | 4/1932 | Plant | 111/132 |
| 4,566,543 | A | | 1/1986 | Kotani | |
| 4,606,412 | A | * | 8/1986 | Classen | 172/22 |
| 4,616,715 | A | * | 10/1986 | Sinkkila | 172/61 |
| 4,819,734 | A | * | 4/1989 | Classen | 172/22 |
| 5,101,745 | A | * | 4/1992 | Podevels et al. | 111/127 |
| 5,406,778 | A | | 4/1995 | Lamb et al. | |
| 5,797,458 | A | | 8/1998 | Simon et al. | |
| 6,142,240 | A | * | 11/2000 | Underhill | 172/22 |
| 7,293,612 | B1 | | 11/2007 | Petersen et al. | |
| 7,730,960 | B1 | | 6/2010 | Knight et al. | |
| 7,971,653 | B2 | * | 7/2011 | Harris, III | 172/21 |
| 8,255,126 | B2 | | 8/2012 | Hunt et al. | |
| 8,955,610 | B1 | * | 2/2015 | Longmeyer | 172/21 |
| 2004/0020062 | A1 | | 2/2004 | Ducret | |
| 2005/0006110 | A1 | * | 1/2005 | Wessel | 172/22 |
| 2008/0257571 | A1 | | 10/2008 | Keane et al. | |
| 2013/0255975 | A1 | * | 10/2013 | Aldridge et al. | 172/2 |

FOREIGN PATENT DOCUMENTS

| DE | 3043696 A1 | 6/1982 |
| EP | 2644014 A1 | 10/2013 |
| GB | 2149734 A | 6/1985 |

OTHER PUBLICATIONS

Search Report issued in counterpart application No. GB1501589.4, dated Jul. 8, 2015 (3 pages).
German Search Report issued in foreign counterpart application No. DE102015201091.0 dated Apr. 4, 2016 (10 pages).

* cited by examiner

*Primary Examiner* — Jamie L McGowan

(57) ABSTRACT

An aerator with variable delay of the coring head includes a lift/lower control on an aerator control panel that raises and lowers a coring head and starts or discontinues rotation of a coring head crankshaft that reciprocates a plurality of coring tines. A delay timer provides a variable time period between starting to raise or lower the coring head and the rotation of the crankshaft. A switch is provided on the control panel to preset the time period.

9 Claims, 3 Drawing Sheets

AERATOR WITH VARIABLE DELAY OF CORING HEAD

FIELD OF THE INVENTION

This invention relates to aerators for aerating ground surfaces. More specifically, the invention relates to walk-behind aerators having coring heads with a plurality of tines that repeatedly penetrate the ground surface.

BACKGROUND OF THE INVENTION

Aerators are commonly used for maintaining landscaped ground surfaces including turf. The term "turf" refers to grass and other material which is specifically grown for sporting activities and is used, for example, to form golf course greens. Aerators on these types of surfaces have a coring head with tines that repeatedly penetrate the ground surface, forming a plurality of holes so that the ground surface is aerated, to improve growth of the grass or other material and enhance the condition of the surface for playing purposes.

In conducting this type of aeration of turf surfaces, the neatness of the holes made by the aerator tines can significantly affect the overall result. For example, in the case of golf greens and the like where the vegetation is short, a hole with rough edges or too large a hole can cause spot erosion, resulting in an undesirable dimple in the ground surface. This effect is aggravated when forward movement of the aerator differs from the speed of the coring head over the ground surface, causing the tines to rake across or break the ground surface.

To minimize rough edges of the holes, aerators may be designed to keep the tines substantially vertical for entry and withdrawal from horizontal ground surfaces. For example, aerators may have flywheels that drive the upper ends of tine supports in a circular path, and the lower ends in a reciprocating motion of repeated penetrations into the ground. Link arms can pivot to compensate for forward motion of the machine. At each part of the cycle when the tines are withdrawn from the ground surface, the link arms may position the tines in a substantially vertical position for the next cycle of penetration into the ground. Tines are generally cylindrical, are hollow or solid, and produce holes by pulling up plugs or cylindrical cores of soil as the tines move by rotation of the flywheel.

Holes produced by aerator tines should be substantially vertical, and perpendicular to ground surfaces. When the aerator enters a green, the operator may use a lift/lower switch or control to lower the coring head and start rotating the coring head crankshaft that reciprocates the tine assemblies. For example, the lift/lower switch or control may actuate a solenoid valve to lower the coring head, and energize a relay to engage a coring head clutch. Alternatively, an electric motor or other device may be used to rotate the coring head crankshaft. The coring head crankshaft may rotate at a higher speed while the tines encounter little or no ground resistance, and the tines do not reach their full coring depth until the coring head is fully lowered. As a result, the tines tend to make shallow holes and also may cause tufted turf at entry to the green. Additionally, the link arms may not keep the tines as vertical while the tines encounter little or no ground resistance. As a result, the tines tend to make oblong holes at entry to the green.

When the aerator exits a green, the operator may use the lift/lower switch to raise the coring head and stop rotating the coring head crankshaft. Once the coring head starts raising, the coring head crankshaft continues rotating as the tines encounter less resistance as they are exiting from the ground. As a result, the tines also tend to make shallow holes and cause tufted turf at exit from the green. Additionally, the link arms may not keep the tines as vertical while the tines encounter less ground resistance. As a result, the tines also tend to make oblong holes at exit from the green.

To address the hole quality problem, an electro-mechanical throttle-back solenoid has been used. The throttle-back solenoid pulls on the aerator engine throttle arm to reduce engine speed, and thereby reduce the coring head crankshaft speed for a short period of time, such as 3 to 5 seconds, while the coring head is lowered. The device requires mechanical adjustment with a thumb screw to change how much the engine speed is reduced.

There is a need for an aerator with a variable delay of the coring head at entry and exit from a green. There is a need for an aerator with variable delay of the coring head at entry and exit having an easily adjustable time delay by the operator. There is a need for an aerator with variable delay of the coring head that is low in cost and high in reliability.

SUMMARY OF THE INVENTION

An aerator with variable delay of the coring head for entry and exit onto a green or other surface. The aerator includes a controller having a timer for setting a delay from starting to lower a coring head until starting to rotate a coring head crankshaft that reciprocates a plurality of coring tines. A delay also may be provided from the signal to stop rotating the coring head crankshaft, either before or after starting to raise the coring head. An operator controlled switch may set the length of the first delay and the second delay. The aerator with variable delay of the coring head at entry and exit from a green has a time delay that is easily adjustable by the operator. The aerator with variable delay of the coring head is low in cost and high in reliability

DESCRIPTION OF THE PREFERRED EMBODIMENT

Figure 1:
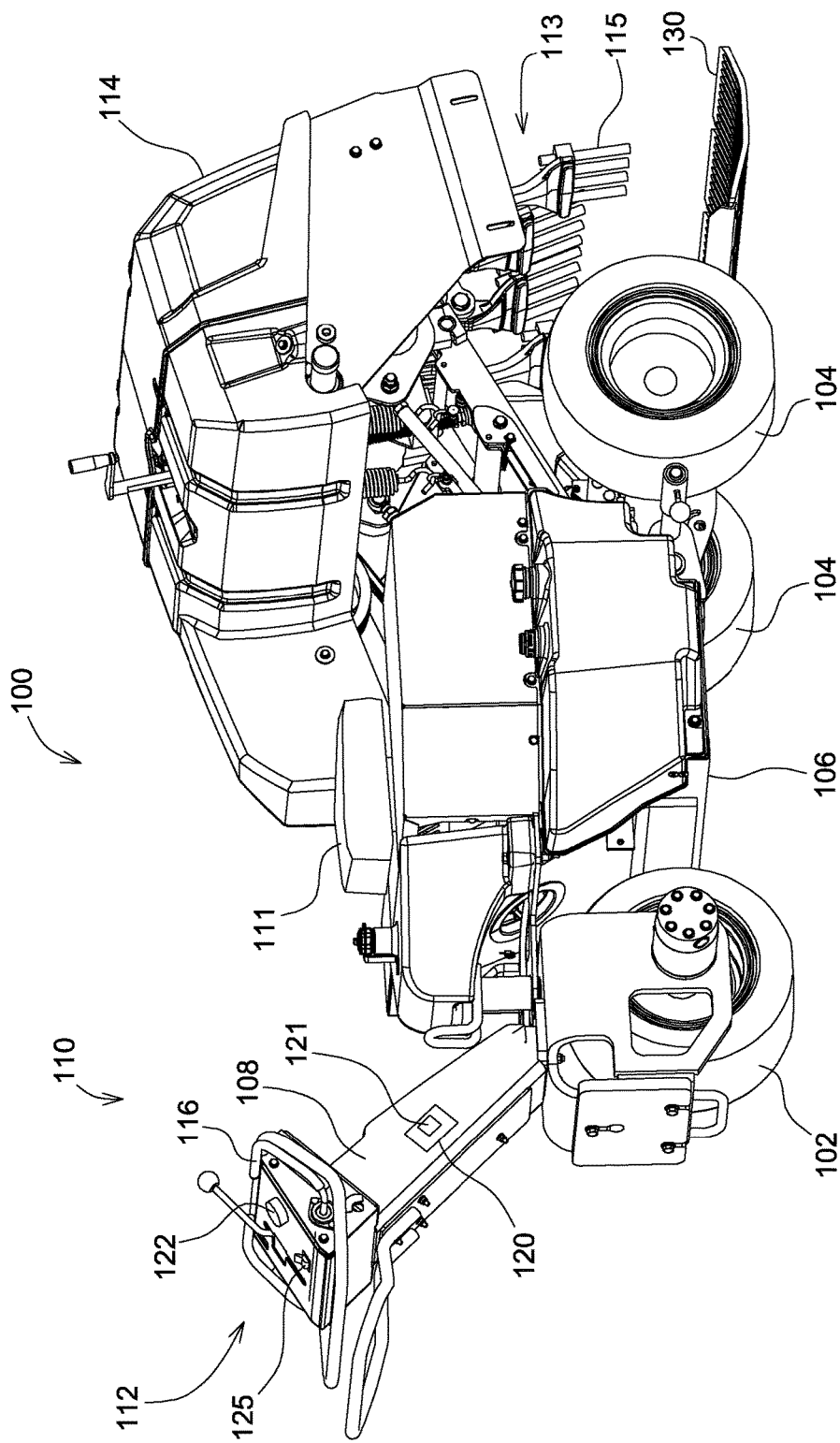
FIG. 1 is a perspective view of an aerator with variable delay of the coring head with the coring head in a fully raised position, according to a preferred embodiment of the invention.
Figure 2:
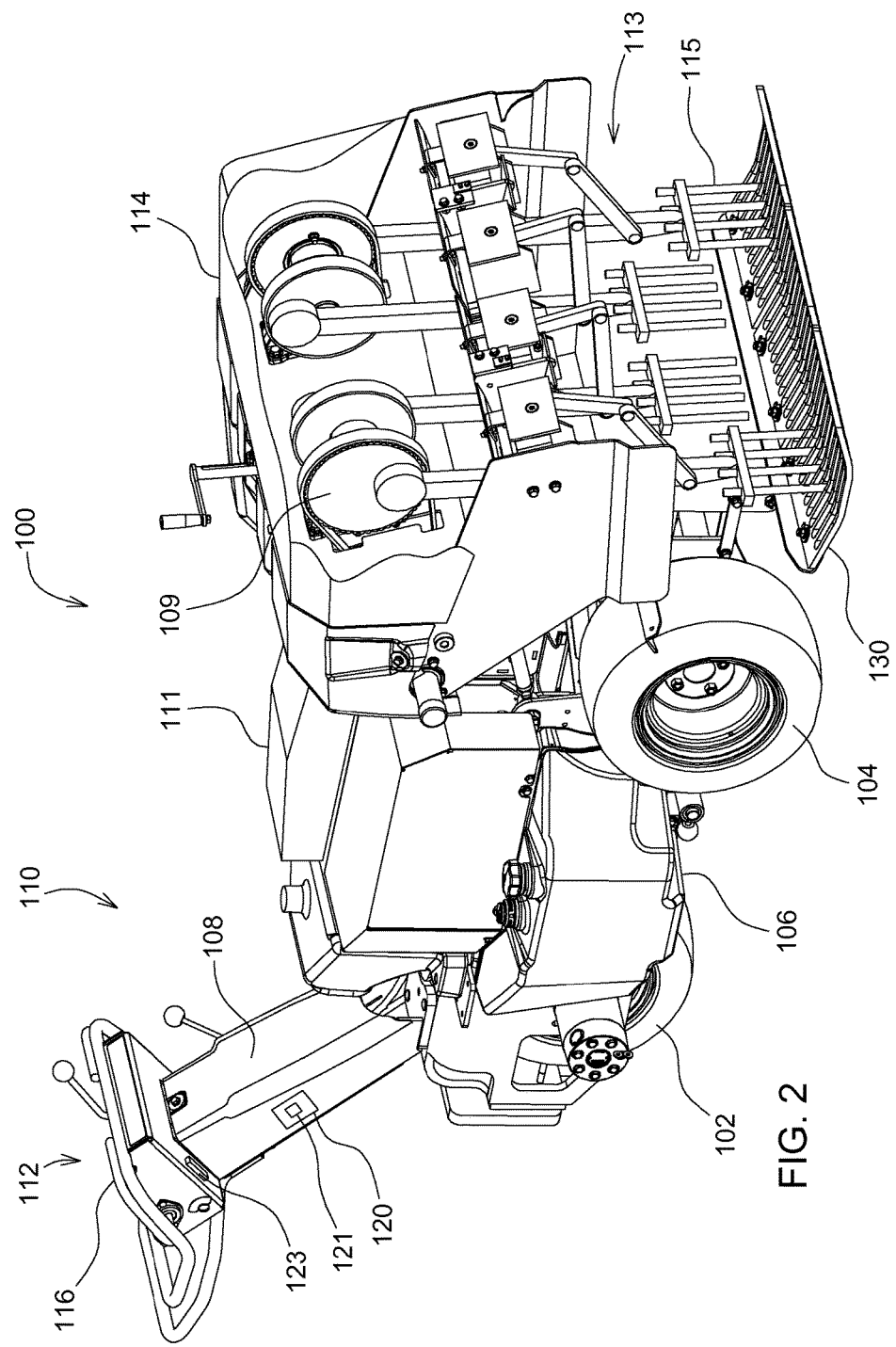
FIG. 2 is a perspective view of an aerator with variable delay of the coring head with the coring head in a partially raised or lowered position, according to a preferred embodiment of the invention.
Figure 3:
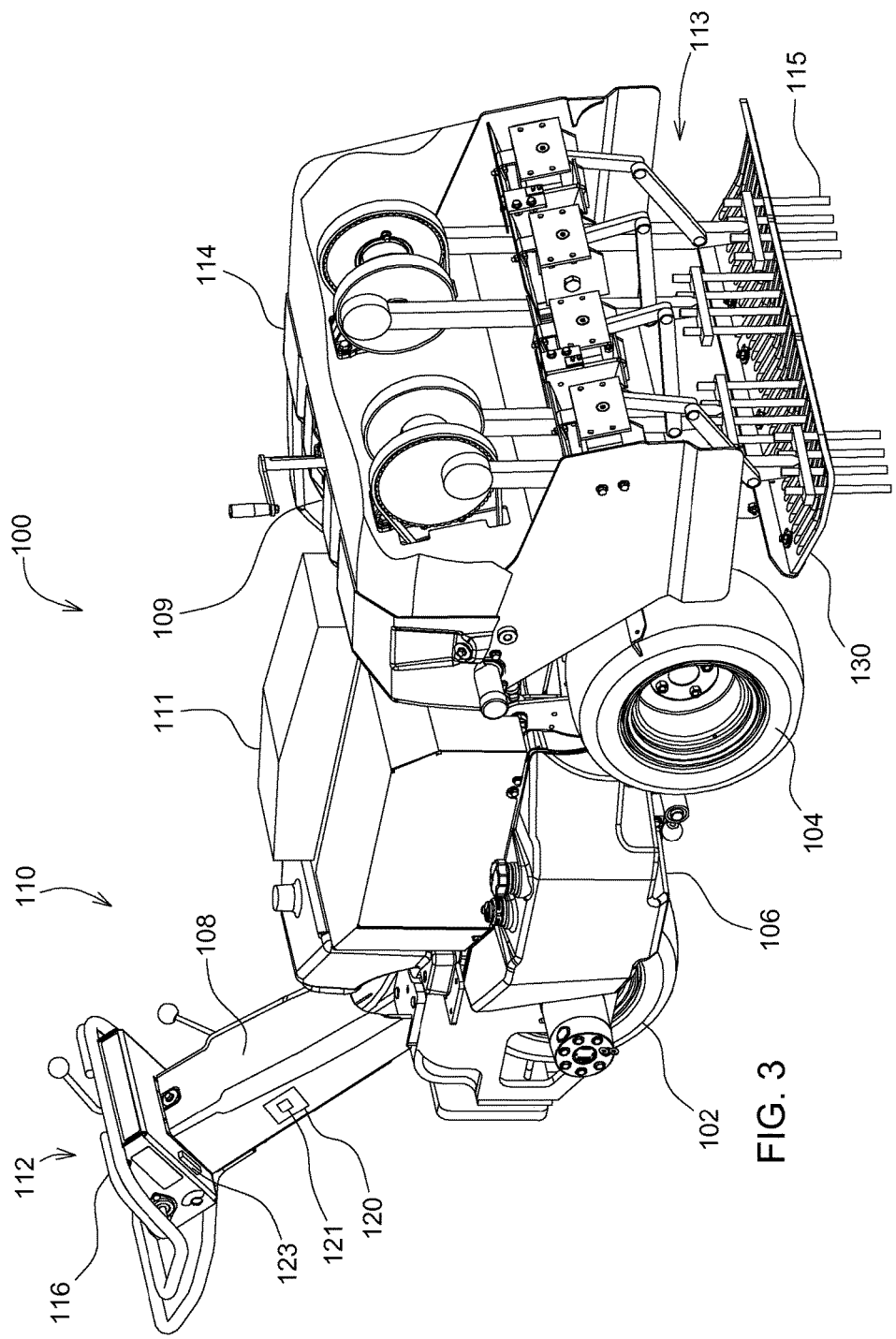
FIG. 3 is a perspective view of an aerator with variable delay of the coring head with the coring head in a fully lowered position, according to a preferred embodiment of the invention.

In one embodiment shown in FIGS. 1-3, walk-behind aerator 100 may be supported for movement over the ground by a single steerable wheel 102, which may or may not be driven, and a pair of driven wheels 104. Frame 106 may have a neck 108 extending upwardly therefrom, and the single steerable wheel may be carried in a pivotal yoke that can rotate about a vertical pivot axis attached to the neck. An upwardly and forwardly extending handle assembly 110 may be coupled to the pivotal yoke that carries the front wheel, and may include control panel 112. An operator may walk ahead of the aerator and steer the vehicle by using the handle assembly to pivot the single steerable front wheel about the vertical pivot axis.

In one embodiment, coring head 114 may be mounted on the rear of the aerator, either behind the rear drive wheels and tires, between the rear drive wheels and tires, or adjacent the rear axle(s). The coring head may carry a plurality of tine assemblies 113 that reciprocate up and down by rotation of crankshaft 109. Each tine assembly may have a plurality of coring tines 115 that are driven into the ground and produce holes for the purpose of aerating the turf. Each tine assembly may include a rubber dampener system that absorbs the forward motion of the aerator to help improve hole quality by minimizing hole elongation.

In one embodiment, the aerator may have an internal combustion engine 111, one or more batteries, and/or any other power source that may be used to operate coring head 114 and provide traction drive for the rear wheels. The internal combustion engine may also drive an alternator to generate electric power, a mechanical or hydrostatic transmission to connect each power source to one or more of the rear wheels. In the case of a hydrostatic transmission, a pump may supply pressurized fluid to a single hydraulic motor or pair of hydraulic motors for rotating the rear wheels. If the aerator has an electric traction drive system, an electric drive motor on each rear wheel may be connected by cables to batteries or the electric power supply.

The aerator described in this application may be provided with a traction drive that can move the machine in the forward direction at a coring ground speed while the coring head is operating, or in the reverse direction while the coring head is not operating. Additionally, the traction drive can move the aerator in the reverse direction at a higher transport speed while the coring head is not operating. An operator typically may walk in front of the aerator as it moves in the forward direction. However, those skilled in the art will understand that the aerator of this invention is not limited to aerators with the same forward and reverse designations used in this application, but is intended to include any other walk behind aerators.

In one embodiment, the operator may operate the traction drive to move the aerator forward or in reverse by moving traction bail 116 in either the forward or reverse direction. The traction bail may be a single lever or a pair of levers pivotably mounted to the sides of the operator controls on the handle assembly of the aerator. The traction bail may be biased to a central or neutral position when released by the operator.

In one embodiment, the aerator may include one or more ground sensors 130 that may be used to detect changes in the slope of the surface being aerated. For example, the ground sensor may be turf guards which are slotted plates that slide along the ground surface. Each turf guard may have a plurality of slots through which the hollow coring tines reciprocate to make holes in the turf. The turf guard holds the turf in place so that when the tines pull out of the ground, the turf around each hole does not lift with them. The turf guard may be spring loaded to provide positive and firm support for the tines as they pull out of the ground, and the pressure may be adjusted to lighter tension for soft conditions, or greater tension for firm conditions. The turf guard may be constructed of plastic or metal, and the bottom of the turf guard may be beveled to help slide along the ground surface as the aerator travels, without grabbing back edges of the holes.

In one embodiment, while the turf guard is in the coring position, it pivots either in a first direction when encountering a hill or rise, or in a second direction when encountering a dip in the ground surface. The pivot axis is horizontal and perpendicular to the direction of travel of the machine. The turf guard may be mechanically linked to a potentiometer that senses angular change or displacement. Alternatively, an encoder, a Hall sensor or other device that provides output relating to the angular change or displacement of the turf guard may be used. As the turf guard encounters a slope change and pivots, it moves the potentiometer an amount corresponding to the change in slope. The potentiometer may provide a signal regarding the slope change to the aerator's electronic control unit 120. The signal may be based on the angular position or inclination of the turf guard, which may be provided to the vehicle control unit at regular intervals such as every 10 milliseconds.

In one embodiment, aerator control unit 120 may provide commands to a frame flex actuator to flex the aerator frame as shown and described in U.S. Pat. No. 8,255,126. The commands from the vehicle control unit are based on ground sensor inputs as it encounters a rise or fall of the ground surface. The frame flex actuator may be a hydraulic cylinder which may extend and retract between the first and second frame sections, or an electric actuator that may flex the first and second frame sections with respect to each other. The frame flex actuator may flex the frame about a horizontal pivot axis that is transverse to the flexible frame aerator's direction of travel.

In one embodiment, the aerator may include a hydraulic lift and lower system to raise the coring head to a transport position and lower the coring head to an operating or coring position. An operator may actuate lift/lower switch or control 125 on control panel 112 to raise and lower the coring head and/or start rotation of the coring head crankshaft that reciprocates the tines. For example, the switch or control may engage a clutch for the coring head crankshaft, or an electric motor that drives the crankshaft. Optionally, an electro hydraulic pump may be provided on the aerator to raise and lower the coring head using electric power.

In one embodiment, the aerator may have an electronic controller 120 having a microprocessor programmed with software providing variable delay of the coring head. More specifically, a variable delay may be provided between starting to lower the coring head and the starting to rotate the coring head crankshaft. This delay may be used at entry before each pass across a golf course green. Similarly, a variable delay may be provided before or after starting to raise the coring head and discontinuing to rotate the coring head crankshaft. This delay may be used at exit after each pass across a golf course green.

In one embodiment, controller 120 may include delay timer 121. The control panel may include a delay switch 123 and a visible display 122 such as an LED, both of which may be connected to the controller and the delay timer. For example, delay switch 123 may be a potentiometer or a toggle switch. The operator may use the delay switch to preset the delay timer for desired time periods at entry and exit of the aerator. The delay may be preset or changed by the operator while the aerator is in normal operating mode and the engine is running. The length of the delay may be set for different times for entry and exit, and may depend on a number of variables including the tines, turf conditions, hole depth and spacing. During entry and exit, the delay count may be flashed on the display 122. The operator may verify the delay by counting pulses on the display.

FIG. 1 shows the aerator with the coring head in a fully raised position, before entry or after exit from a golf course green. At entry to the green, the operator may actuate lift/lower control 125 connected to controller 120. The controller may provide a signal to a solenoid valve or other mechanism to start lowering coring head 114. While the coring head is lowered, the delay timer 121 may run for a preset time period such as 0.5 seconds. Once the delay timer reaches the preset delay time, the controller then may provide a signal to start rotating the coring head crankshaft.

FIG. 2 shows coring head 114 that has started dropping and is partially lowered when the controller provides a signal to start rotating the coring head crankshaft that reciprocates the tines. As a result of the coring head being partially lowered, the coring head crankshaft may rotate at a lower speed and the tines may encounter ground resistance soon after the coring head crankshaft starts rotating. FIG. 3 shows the coring head after it is fully lowered.

In one embodiment, during exit from the green, the operator may actuate the lift/lower control connected to the controller. The controller may provide a signal to the relay to discontinue rotation of the coring head crankshaft and start the delay timer. The coring head crankshaft may slow down as it continues rotating during the preset exit delay time. The exit delay time may be different from the entry delay time. Once the delay timer reaches the preset exit delay time, the controller then may provide a signal to start raising the coring head. The coring head crankshaft may have slowed down but is still rotating when the controller provides a signal to start raising the coring head. The coring tines may continue to reciprocate and encounter ground resistance as the coring head is raised.

In one embodiment, the operator also may use switch 123 to preset exit delay time so that the controller provides a signal to start raising the coring head before or after providing a signal to stop rotating the coring head crankshaft. A delay before or after starting to raise the coring head may be desirable under different turf conditions.

Having described the preferred embodiment, it will become apparent that various modifications can be made without departing from the scope of the invention as defined in the accompanying claims.

The invention claimed is:

1. An aerator with variable delay of the coring head, comprising:
    a lift/lower control on an aerator control panel that provides signals to move a coring head between a transport position and a coring position and rotate a crankshaft that reciprocates a plurality of coring tines at a coring head crankshaft speed;
    a delay timer to provide a delay between starting to move the coring head between the transport position and the coring position and starting or stopping rotation of the crankshaft; the coring head crankshaft rotating slower than the coring head crankshaft speed while starting or stopping rotation as the coring head is moving between the transport position and the coring position; and
    a switch on the control panel to preset the delay timer to any of a plurality of operator adjustable time periods.

2. The aerator with variable delay of the coring head of claim 1 further comprising a first preset time delay between starting to lower the coring head and starting rotation of the crankshaft, and a second preset time delay between stopping rotation of the crankshaft and starting to raise the coring head.

3. The aerator with variable delay of the coring head of claim 1 wherein the delay timer is included in a controller connected to the lift/lower control and the switch.

4. The aerator with variable delay of the coring head of claim 1 further comprising a solenoid that is actuated to raise and lower the coring head.

5. An aerator with variable delay of the coring head of claim 1 further comprising a relay that is actuated to engage and disengage a clutch for the crankshaft.

6. An aerator with variable delay of the coring head, comprising:
    a controller having a timer for a first delay from starting to lower a coring head until starting to rotate a coring head crankshaft that reciprocates a plurality of coring tines, and for a second delay from discontinuing rotation of the coring head crankshaft until starting to raise the coring head; the coring head crankshaft rotating at a slower speed while starting to rotate or discontinuing rotation as the coring head is raised and lowered than when the coring head is fully lowered;
    an operator controlled switch to change the length of the first delay and the second delay.

7. The aerator with variable delay of the coring head of claim 6 further comprising a display showing the time of the first delay and the second delay.

8. The aerator with variable delay of the coring head of claim 6 wherein the operator controlled switch also may be used to set the second delay from starting to raise the coring head until discontinuing rotation of the coring head crankshaft.

9. An aerator with variable delay of the coring head, comprising:
    a control panel having a raise/lower control for a coring head and a switch to preset a time delay for entry of the aerator onto a green and preset a time delay upon exit from the green; the time delays for entry and exit each being operator adjustable in duration;
    a controller that provides a signal to start lowering the coring head with the preset time delay for entry before starting rotation of a coring head crankshaft, and a signal to discontinue rotation of the coring head crankshaft with the preset time delay for exit either before or after starting to raise the coring head; the coring head crankshaft rotating at a slower speed while lowering or raising the coring head than when the coring head is fully lowered.

* * * * *